(12) United States Patent
Edwards et al.

(10) Patent No.: US 7,960,853 B2
(45) Date of Patent: *Jun. 14, 2011

(54) SWITCH-BASED DOOR AND RAMP INTERFACE SYSTEM

(75) Inventors: Paul Edwards, Durango, CO (US); Wade Nelson, Durango, CO (US); Greg Berthelot, Farmington, NM (US)

(73) Assignee: The Braun Corporation, Winamac, IN (US)

(*) Notice: Subject to any disclaimer, the term of this patent is extended or adjusted under 35 U.S.C. 154(b) by 133 days.

This patent is subject to a terminal disclaimer.

(21) Appl. No.: 12/266,147

(22) Filed: Nov. 6, 2008

(65) Prior Publication Data

US 2009/0133334 A1 May 28, 2009

Related U.S. Application Data

(63) Continuation of application No. PCT/US2007/069284, filed on May 18, 2007, which is a continuation of application No. 11/436,458, filed on May 18, 2006, now Pat. No. 7,417,395.

(51) Int. Cl.
*H02P 1/00* (2006.01)
*B62B 1/06* (2006.01)

(52) U.S. Cl. .......................... 307/9.1; 318/445

(58) Field of Classification Search ............... 307/9.1, 307/10.1; 414/921, 537, 540; 14/71.3, 69.5; 701/49
See application file for complete search history.

(56) References Cited

U.S. PATENT DOCUMENTS

| | | | |
|---|---|---|---|
| 3,651,965 A | 3/1972 | Simonelli et al. | |
| 3,874,527 A | 4/1975 | Royce | |
| 4,164,292 A | 8/1979 | Karkau | |
| 4,176,999 A | 12/1979 | Thorley | |
| 4,251,179 A | 2/1981 | Thorley | |
| 4,325,668 A | 4/1982 | Julian et al. | |
| 5,140,316 A | 8/1992 | DeLand et al. | |
| 5,180,275 A | 1/1993 | Czech et al. | |
| 5,293,632 A | 3/1994 | Novakovich et al. | |
| 5,305,355 A | 4/1994 | Go et al. | |
| 5,308,214 A * | 5/1994 | Crain et al. | 414/541 |
| 5,350,986 A | 9/1994 | Long et al. | |
| 5,389,920 A | 2/1995 | DeLand et al. | |
| 5,391,041 A | 2/1995 | Stanbury et al. | |

(Continued)

OTHER PUBLICATIONS

"The 1999 Ford Windstar," VMI Voice Technical Edition, Publication, (Apr. 1999).

(Continued)

*Primary Examiner* — Albert W Paladini
(74) *Attorney, Agent, or Firm* — Michael Best & Friedrich LLP

(57) ABSTRACT

An interface system prevents operational interference between a vehicle power door and a ramp of an access system by interrupting power to the motors and actuators responsible for operating the door. The interface system includes a relay system that does not interrupt, read, signal, or otherwise interfere with the communication lines between a body control unit, door control unit, or remote control transmitter or receiver. Thus, the interface system functions without the need to receive and transmit signals on the vehicle's communication bus. The interface system enables the ramp controller of the access system to be a separate module, which controls the ramp and kneel functions, because the only input the ramp controller provides to the power door system is to a ground signal that mimics that of a switch included in the vehicle.

18 Claims, 2 Drawing Sheets

U.S. PATENT DOCUMENTS

| | | | |
|---|---|---|---|
| 5,396,158 | A | 3/1995 | Long et al. |
| 5,434,487 | A | 7/1995 | Long et al. |
| 5,697,048 | A | 12/1997 | Kimura |
| 5,737,335 | A | 4/1998 | Mizuta et al. |
| 5,769,480 | A | 6/1998 | Gebhardt |
| 5,825,098 | A | 10/1998 | Darby et al. |
| 5,835,873 | A | 11/1998 | Darby et al. |
| 5,979,114 | A | 11/1999 | Clark et al. |
| 6,028,537 | A | 2/2000 | Suman et al. |
| 6,075,460 | A | 6/2000 | Minissale et al. |
| 6,238,168 | B1 | 5/2001 | Cohn et al. |
| 6,275,167 | B1 | 8/2001 | Dumbrowski et al. |
| 6,300,879 | B1 | 10/2001 | Regan et al. |
| 6,302,439 | B1 | 10/2001 | McCurdy |
| 6,409,458 | B1 | 6/2002 | Cohn et al. |
| 6,515,377 | B1 | 2/2003 | Ubelein et al. |
| 6,825,628 | B2 | 11/2004 | Heigl et al. |
| 7,417,395 | B2 * | 8/2008 | Edwards et al. ............... 318/445 |
| 7,453,224 | B2 | 11/2008 | Sullivan |
| 7,551,995 | B2 * | 6/2009 | Heigl et al. ...................... 701/36 |
| 7,684,915 | B1 * | 3/2010 | Dailey et al. .................... 701/49 |
| 2003/0007851 | A1 | 1/2003 | Heigl et al. |
| 2003/0007853 | A1 | 1/2003 | Cohn et al. |
| 2003/0044266 | A1 | 3/2003 | Vandillen et al. |
| 2007/0086879 | A1 | 4/2007 | Goodrich et al. |
| 2009/0240402 | A1 | 9/2009 | Lugash et al. |

OTHER PUBLICATIONS

"Activan, Accessibility with Style. Conversion of General Motors Minivans," Service Manual, (Dec. 9, 1999), Published by Ricon Corporation.

"Braun Entervan," Brochure, (2001), Published by the Braun Corporation.

"Entervan, the Braun Corporation," Series 03 and later Fully-Automatic 1996 and newer Chrysler Entervan II, Owner's/ Service Manual, (Revision Aug. 1998), 5230096-03.

Holicky, Richard, "Big Vans, Minivans Pros and Cons," New Mobility Magazine, (Jun. 1997).

"Honda Odyssey Minivan Conversion," Owner's Manual, (Oct. 2006), Published by VMI.

"New Ramp & Electrical Systems on All Power Rampvans," www.ims-vans.com/RampElectrical.htm, (May 12, 1999).

"Odyssey 2005-2006 Electrical Troubleshooting," Manual, (Mar. 2006), Published by American Honda Motor Co., Inc.

"Automotive: Serial Communication," Installation Guide Model MPC01 Multi-Purpose Controller, (1998), Published by Whelan Engineering Company Inc., Chester, CT.

"Automotive: Serial Communication," Operating Guide Model MPC01 Multi-Purpose Controller, (1995), Published by Whelan Engineering Company Inc., Chester, CT.

Sunderlin, Ann, "Van-Tastic, How'd They Do That," (Nov. 1995), Paraplegia News Magazine.

"Wheels 2000 and Beyond," New Mobility Magazine, p. 48, publicly available prior to Jan. 1, 2002.

"VMI-4 Ford Windstar Factory Door Lockout Relay Pack," "Operational Characteristics of the VMI-4 Module," Technical Service Manual, (Mar. 9, 2000).

"IMS Quality Team 1991-2001 Service Manual" Independent Mobility Systems, Inc. (Jan. 8, 1999).

"Honda Odyssey Minivan Conversion Owner's Manual" Vantage Mobility International (Oct. 2006).

"Ricon Activan Illustrated Index of Non-OEM Vehicle Equipment Including Electrical and Pneumatic Circuit Diagrams plus Diagnostic Flow Charts" Ricon Corporation, pp. 1-1 to 3-5 (May 10, 1999 -Jun. 3, 1999).

"Ricon Activan General Motors Minivan Conversion Service Manual—32DV0002.C" Ricon Corporation, pp. 1-1 to 6-13 (Jan. 3, 2000).

"Ricon Activan Service/Owner Manual—35DACT00.E" Ricon Corporation (Dec. 3, 1998).

Declaration of Steven Stadler (Jul. 28, 2006).

"Ricon Activan Conversion of General Motors Minivans Service Manual—32DV0002.A" Ricon Corporation (Dec. 9, 1999).

"Ricon Activan Conversion of General Motors Minivans Service Manual—32DV0002.B" Ricon Corporation (Dec. 9, 1999).

"Vantage Mini Vans Technical Service Manual" Vantage Mobility International (Jul. 10, 1997).

Vantage Mobility International Online Service Materials, Minivan Products Summit Northstar Kia HAV.

Vantage Mobility International Service Manual Excerpts for Systems Designed for 1993-2001 Model-Year Vehicles.

"IMS-Vans.com Whois Record" accessed from Domain Tools (Sep. 19, 2009).

"Vantage Mini Vans Owners Manual" Vantage Mobility International.

"VMI Minivan Conversions Owner's Manual" Vantage Mobility International.

Various Power Sliding Door Electrical Diagrams for 1997-1999 Model-Year Vehicles, accessed from ALLDATA Online (Aug. 20, 20009).

Waybackmachine www.ims-vans.com Website Excerpts from 1998-1999.

Waybackmachine www.braunlift.com Website Excerpts from 2000.

Correspondence, Pricing Lists and Invoices Relating to Ricon Activan (1999).

"EV Braun Entervan Brochure" The Braun Corporation (1999).

"Entervan Application Guide" The Braun Corporation (Jan. 1999).

"IMS Service Manual 1996-1998 Chrysler NS 1996-1998 Ford Windstar" Independent Mobility Systems, Inc. (Nov. 24, 1997).

"IMS 2004 Sienna Rampvan Service Manual" Independent Mobility Systems, Inc.

"IMS Service Manual 1994-1995 Chrysler" Independent Mobility Systems, Inc. (May 3, 1996).

"Plaintiff The Braun Corporation's Claim Terms at Issue and Proposed Definitions" *The Braun Corporation* v. *Vantage Mobility International, LLC et al.*, Civil Action No. 06-cv-050 RL, United States District Court for the Northern District of Indiana Hammond Division (Jun. 14, 2007).

"Plaintiff's Responses to Defendant American Honda Motor Co., Inc.'s First Set of Interrogatories (Nos. 1-12)" *The Braun Corporation* v. *Vantage Mobility International, LLC et al.*, Civil Action No. 06-cv-050 RL, United States District Court for the Northern District of Indiana Hammond Division (Dec. 18, 2006).

Draft Invalidity Claim Chart for IMS System: '628 Patent by David M. Auslander (Mar. 26, 2009).

"Braun's Responses to VMI's Requests for Admissions" *The Braun Corporation* v. *Vantage Mobility International, LLC*1, Civil Action No. 2:06-cv-050-JVB-PRC, United States District Court for the Northern District of Indiana Hammond Division (Apr. 5, 2010).

Draft Invalidity Claim Chart for Ricon System: '628 Patent by David M. Auslander (Mar. 26, 2009).

Braun OEM Door Patent Review by Paul Edwards and Summary of Paul Edwards Interview Jun. 3, 2006.

"SAE J1850 Class B Data Communications Network Interface J1850 Topics" Bill Wiegand, GM Service Technology Group (Feb. 16, 1998).

"List of Terms to be Defined in the '628 Patent" *The Braun Corporation* v. *Vantage Mobility International, LLC*, Civil Action No. 2:06-cv-050-RL-PRC, United States District Court for the Northern District of Indiana Hammond Division (Jun. 14, 2007).

"VMI's Supplemental Answer to Interrogatory No. 9" *The Braun Corporation* v. *Vantage Mobility International, LLC et al.*, Civil Action No. 06-cv-050 RL, United States District Court for the Northern District of Indiana Hammond Division (May 27, 2009).

"Parties' Responses to Proposed Order & Opinion—Transcript of Proceedings" *The Braun Corporation* v. *Vantage Mobility International, LLC*, Civil Action No. 2:06-cv-050-JVB, United States District Court for the Northern District of Indiana Hammond Division (Jul. 28, 2008).

"Vantage Mobility International, LLC's Answers to Interrogatories" *The Braun Corporation* v. *Vantage Mobility International, LLC et al.*, Civil Action No. 06-cv-050 RL, United States District Court for the Northern District of Indiana Hammond Division (Mar. 12, 2007).

"Initial Disclosure Statement" *The Braun Corporation* v. *Vantage Mobility International, LLC*, Civil Action No. 2:06-cv-050-RL, United States District Court for the Northern District of Indiana Hammond Division (Sep. 12, 2006).
"Vantage Mobility International, LLC's Answers to Braun's Third Set of Interrogatories" *The Braun Corporation v. Vantage Mobility International, LLC et al.*, Civil Action No. 06-cv-050 RL, United States District Court for the Northern District of Indiana Hammond Division (May 14, 2007).
Ricon Updated Remote Control Specification (Mar. 20, 1998).
Vantage Mobility International, LLC's Answers to Braun's First Set of Interrogatories, *The Braun Corporation v. Vantage Mobility International, LLC et al.*, Civil Action No. 06-cv-050 RL, United States District Court for the Northern District of Indiana Hammond Division (Dec. 18, 2006).
"Supplemental Answers to Interrogatories" *The Braun Corporation v. Vantage Mobility International, LLC et al.*, Civil Action No. 06-cv-050 RL, United States District Court for the Northern District of Indiana Hammond Division (May 15, 2009).
"Amended Complaint for Patent Infringement" *The Braun Corporation v. Vantage Mobility International, LLC et al.*, Civil Action No. 06-cv-050 RL, United States District Court for the Northern District of Indiana Hammond Division (Jun. 15, 2006).
"Vantage Mobility International's Third Supplemental Responses to Requests for Production" *The Braun Corporation v. Vantage Mobility International, LLC et al.*, Civil Action No. 06-cv-050 RL, United States District Court for the Northern District of Indiana Hammond Division (Mar. 12, 2007).
"Defendant Vantage Mobility International, LLC's Answer to Plaintiff's Complaint and Counterclaim" *The Braun Corporation v. Vantage Mobility International, LLC*, Civil Action No. 2:06-cv-050-RL-PRC, United States District Court for the Northern District of Indiana Hammond Division (Aug. 9, 2006).
"Amended Answer of Defendant American Honda Motor Co., Inc." *The Braun Corporation v. Vantage Mobility International, LLC et al.*, Civil Action No. 06-cv-050 RL, United States District Court for the Northern District of Indiana Hammond Division (Aug. 22, 2006).
"Plaintiff's Reply to Defendant American Honda Motor Co.'s Counterclaim" *The Braun Corporation v. Vantage Mobility International, LLC et al.*, Civil Action No. 06-cv-050 RL, United States District Court for the Northern District of Indiana Hammond Division (Aug. 29, 2006).
"Plaintiff's Reply to Defendant Vantage Mobility International, LLC's Counterclaim" *The Braun Corporation v. Vantage Mobility International, LLC et al.*, Civil Action No. 06-cv-050 RL, United States District Court for the Northern District of Indiana Hammond Division (Aug. 29, 2006).
"Defendant Vantage Mobility International, LLC's Amended Answer to Plaintiff's Complaint and Counterclaim" *The Braun Corporation v. Vantage Mobility International, LLC*, Civil Action No. 2:06-cv-050-RL-PRC, United States District Court for the Northern District of Indiana Hammond Division (Apr. 19, 2007).
"Response to Motion to Dismiss or Strike Defendant Vantage Mobility International, LLC's Defense of Inequitable Conduct" *The Braun Corporation v. Vantage Mobility International, LLC*, Civil Action No. 2:06-cv-050-RL-PRC, United States District Court for the Northern District of Indiana Hammond Division (Jun. 11, 2007).
"Claim Construction Brief" *The Braun Corporation v. Vantage Mobility International, LLC*, Civil Action No. 2:06-cv-050-RL-PRC, United States District Court for the Northern District of Indiana Hammond Division (Jun. 28, 2007).
"Plaintiff's Response to Defendant's Claim Construction Brief" *The Braun Corporation v. Vantage Mobility International, LLC*, Civil Action No. 2:06-cv-050-RL-PRC, United States District Court for the Northern District of Indiana Hammond Division (Jul. 26, 2007).
"Declaration of Mathew G. Gavronski in Support of Plaintiff's Response to Defendant's Claim Construction Brief" *The Braun Corporation v. Vantage Mobility International, LLC*, Civil Action No. 2:06-cv-050-RL, United States District Court for the Northern District of Indiana Hammond Division (Jul. 26, 2007).
"Reply to Plaintiff's Claim Construction Brief and Request for Hearing" *The Braun Corporation v. Vantage Mobility International, LLC*, Civil Action No. 2:06-cv-050-RL-PRC, United States District Court for the Northern District of Indiana Hammond Division (Jul. 26, 2007).

"Plaintiff's Sur-Reply Brief on Claim Construction and Memorandum in Support of Motion to Strike the Declaration of David M. Auslander" *The Braun Corporation v. Vantage Mobility International, LLC*, Civil Action No. 2:06-cv-050-JVB-PRC, United States District Court for the Northern District of Indiana Hammond Division (Oct. 5, 2007).
"Sur-Reply to Plaintiff's Reply and Sur-Reply Brief on Claim Construction" *The Braun Corporation v. Vantage Mobility International, LLC*, Civil Action No. 2:06-cv-050-RL-PRC, United States District Court for the Northern District of Indiana Hammond Division (Oct. 29, 2007).
"Proposed Opinion and Order" *The Braun Corporation v. Vantage Mobility International, LLC*, Civil Action No. 2:06-cv-050 JVB, United States District Court for the Northern District of Indiana Hammond Division (Jul. 17, 2008).
"Defendant's Supplemental Claim Construction Brief" *The Braun Corporation v. Vantage Mobility International, LLC*, Civil Action No. 2:06-cv-050-JVB-PRC, United States District Court for the Northern District of Indiana Hammond Division (Sep. 22, 2008).
"Plaintiff's Reply to Defendant's Supplemental Claim Construction Brief" *The Braun Corporation v. Vantage Mobility International, LLC*, Civil Action No. 2:06-cv-050-JVB-PRC, United States District Court for the Northern District of Indiana Hammond Division (Oct. 23, 2008).
"Reply Brief in Support of Defendant's Supplemental Claim Construction Brief" *The Braun Corporation v. Vantage Mobility International, LLC*, Civil Action No. 2:06-cv-050-JVB, United States District Court for the Northern District of Indiana Hammond Division (Nov. 7, 2008).
"Opinion and Order" *The Braun Corporation v. Vantage Mobility International, LLC*, Civil Action No. 2:06-cv-050-JVB, United States District Court for the Northern District of Indiana Hammond Division (Mar. 26, 2009).
"Opinion and Order" *The Braun Corporation v. Vantage Mobility International, LLC*, Civil Action No. 2:06-cv-050-JVB-PRC, United States District Court for the Northern District of Indiana Hammond Division (Jan. 27, 2010).
"Defendant Vantage Mobility International, LLC's Second Amended Answer to Plaintiff's Complaint and Counterclaim" *The Braun Corporation v. Vantage Mobility International, LLC*, Civil Action No. 2:06-cv-050-JVB-PRC, United States District Court for the Northern District of Indiana Hammond Division (Feb. 1, 2010).
"Braun's Reply to VMI's Second Amended Counterclaim" *The Braun Corporation v. Vantage Mobility International, LLC*, Civil Action No. 2:06-cv-050-JVB-PRC, United States District Court for the Northern District of Indiana Hammond Division (Feb. 17, 2010).
"Defendant American Honda Motor Co., Inc's Responses to Plaintiff The Braun Corporation's First Set of Interrogatories" *The Braun Corporation v. Vantage Mobility International, LLC et al.*, Civil Action No. 06-cv-050 RL, United States District Court for the Northern District of Indiana Hammond Division (Dec. 18, 2006).
"Plaintiff's Claim Construction Memorandum" *The Braun Corporation v. Vantage Mobility International, LLC*, Civil Action No. 2:06-cv-050 RL, United States District Court for the Northern District of Indiana Hammond Division (Jun. 28, 2007).
"VMI's Response to Interrogatories" *The Braun Corporation v. Vantage Mobility International, LLC*, Civil Action No. 2:06-cv-050-JVB-PRC United States District Court for the Northern District of Indiana Hammond Division (Apr. 12, 2010).
"VMI's Response to Braun's Second Set of Requests for Production" *The Braun Corporation v. Vantage Mobility International, LLC*, Civil Action No. 2:06-cv-050-JVB-PRC United States District Court for the Northern District of Indiana Hammond Division (Apr. 12, 2010).
Declaration of Sean Whitmarsh (Apr. 9, 2010).
"Plaintiff's Responses to Vantage Mobility International, LLC's First Set of Interrogatories" *The Braun Corporation v. Vantage Mobility International, LLC*, Civil Action No. 2:06-cv-050-RL-PRC United States District Court for the Northern District of Indiana Hammond Division (Mar. 8, 2007).

* cited by examiner

# SWITCH-BASED DOOR AND RAMP INTERFACE SYSTEM

REFERENCE TO RELATED APPLICATIONS

This application is a continuation of International Patent Application No. PCT/US2007/069284, filed May 18, 2007, which is a continuation of U.S. patent application Ser. No. 11/436,458, filed May 18, 2006, now U.S. Pat. No. 7,417,395. The entire contents of these applications are incorporated by reference herein.

BACKGROUND

Access systems, such as motorized lifts, have been used to transport people and cargo. These access systems include platforms, ramps, moving seats, movable steps, and the like, which may be attached to stationary structures, such as buildings and loading docks, or mobile structures such as vehicles. Access systems have been used to provide disabled individuals access to structures that traditionally were accessible only via steps or stairs, or required an individual to step over or across an obstacle. For example, motorized lifts have been used to allow disabled individuals to enter and exit vehicles. In another example, motorized lifts have been used to load and/or unload stretchers from vehicles, such as ambulances. Motorized lifts have also been used on loading docks and trucks to allow cargo to be loaded, unloaded or otherwise moved.

When an access system is installed in a vehicle that includes a power sliding door, the access system may be configured to interface with the power sliding door system of the vehicle. As understood in the industry, components, such as power sliding doors, that are installed in the vehicle by the vehicle manufacturer are referred to as OEM components. The OEM power sliding door system opens or closes the door when it receives a request to do so (a "door operation request"). Some power sliding door systems include a body control unit, a door control unit, a receiver, various door switches, and a data bus. The body control unit, door control unit, receiver and at least some of the door switches are in communication with the vehicle's data bus, which enables various vehicle components to communicate with each other, for example, to receive a signal from a user indicating that the user wants to open or close the door (a "door operation request").

Depending upon the specific vehicle, the user may communicate a door operation request to the power door system by pulling on a door handle of the vehicle, depressing one of the door switches located throughout the vehicle, or by pushing a button on a keyless entry device. If the door operation request is produced by the keyless entry device, the request is often received by the remote receiver, transmitted to the body control unit, and if appropriate, communicated to the door control unit over the data bus. If the door operation request is produced by movement of the door handle, the door operation request is often communicated directly to the door control unit, but will only be executed (e.g. by opening or closing the door) if appropriate vehicle conditions are detected by the body control unit. If the door operation request is produced by movement of one of the door switches located throughout the vehicle, depending upon the specific switch, the door operation request may be communicated directly to the body control unit, or may be communicated to the body control unit or to the door control unit via the data bus. Once the door operation request reaches the body control unit or the door control unit, the door operation request is managed in the manner discussed above.

As mentioned, door operation requests will only be executed if the body control unit determines that vehicle conditions are satisfactory to allow operation of the door. For example, the body control unit may receive signals via the data bus indicating the status of the transmission position, speed and door lock position of the vehicle. If the body control unit determines that vehicle conditions areacceptable (e.g. the vehicle is in park), the body control unit communicates an authorization command to the door control unit so that the door control unit will operate to move the door in response to receiving a door operation request. The door control unit operates to move the door by supplying electrical power to motors, clutches and actuators that unlatch, and open or close the door.

When access systems are installed in vehicles with OEM power sliding door systems, the access system must be configured such that operation of the ramp by the access system and operation of the door by the power sliding door system are coordinated to prevent interference between the door and the ramp. One method of preventing such interference is installing the access system in a manner that interrupts the door operation commands sent from the body control unit to the door control unit. This method requires the access system to be in communication with the data bus of the power sliding door system, either directly or through a gateway. While these methods have proven effective in the past, vehicle manufacturers are becoming less willing to allow installers of vehicle access systems to modify or otherwise communicate with or on the vehicle data bus.

SUMMARY

The invention may include a control system for providing wheelchair access to a vehicle that has a door and a ramp. The system includes a door actuator that is operable to move the door between an opened position and a closed position, and a ramp actuator that is operable to move the ramp between a stowed position and a deployed position. A door control unit is operable to control a supply of electrical power delivered to the door actuator in response to a door operation request. A power line coupled between the door control unit and the door actuator carries the supply of electrical power to the door actuator. An access controller is coupled to the ramp actuator and to the power line, and is operable to selectively prohibit the supply of electrical power from reaching the door actuator when the ramp is deployed.

The invention may also include a method for controlling a door operation system and a ramp system in a vehicle modified for handicapped access. The method includes selecting a vehicle with an OEM door operation system including a door control unit and a door actuator. The door control unit is operable to provide a supply of electrical power to the door actuator. An access controller is installed in the vehicle and coupled to the door operation system between the door control unit and the door actuator. The access controller is also coupled to the ramp system, which includes a ramp. When the ramp is in a deployed position, the supply of electrical power provided by the door control unit is prevented from reaching the door actuator.

BRIEF DESCRIPTION OF THE DRAWINGS

The invention can be better understood with reference to the following drawings and description. The components in the figures are not necessarily to scale, emphasis instead being placed upon illustrating the principles of the invention. In the figures, the same reference symbols designate the same parts, components, modules or steps, unless and to the extent indicated otherwise.

DETAILED DESCRIPTION

Figure 1:
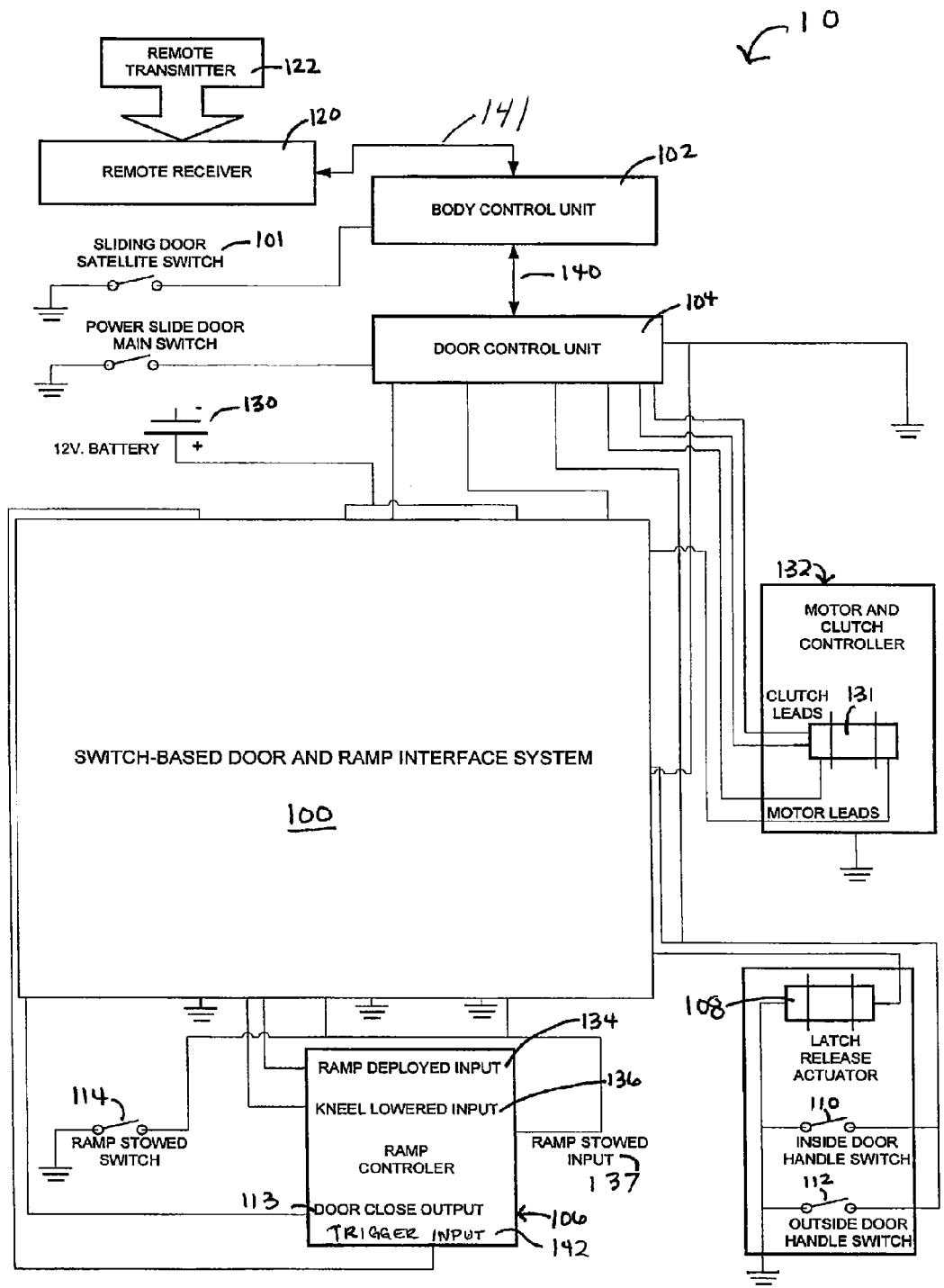
FIG. 1 is a block diagram of a switch-based interface system as implemented between a power sliding door system and a ramp controller.

FIG. 1 illustrates an access system 10 that provides access to a vehicle. The access system 10 includes an access controller in the form of a switch-based door and ramp interface system 100 and a ramp control system 106 that are connected to and interface with various OEM vehicle components to coordinate operation of the door and the ramp. The interface system 100 is coupled to and cooperates with an OEM door control unit 104, which is operable to open and close the door of the vehicle (not shown). To open and close the door, the door control unit 104 communicates and cooperates with other OEM components including a body control unit 102, a remote receiver 120, a remote transmitter 122 (generally in the form of a remote key fob), a communications bus 140 and various door switches, including sliding door satellite switch 101. The door control unit 104 operates to provide electrical power to a motor and clutch controller 132 including a door motor 131, and a door latch release actuator 108.

The ramp control system 106 is coupled to the interface system 100 and is operable to deploy and stow the ramp (not shown). Unlike the door control unit 104, body control unit 102 and other OEM components discussed above, the interface system 100, the ramp control system 106, and other components of the access system 10 are generally installed by a third party after the vehicle has been manufactured. Therefore, it is unlikely that the door control unit 104 includes a mechanism that will prevent operational interference between the door and the ramp. As a result, the interface system 100 is generally installed in the vehicle with the access system 10 to coordinate operation of the OEM door control unit 104 with the aftermarket ramp control system 106.

One way in which the interface system 100 prevents operational interference between the ramp and the door is by interrupting electrical power communicated by the door control unit 104 to the door motor 131 when the ramp is not fully stowed. The interface system 100 is also coupled between the door control unit 104 and the latch release actuator 108. The latch release actuator 108 unlatches the door from the frame of the vehicle so that the door is free to move. Once the door is unlatched, the motor and clutch controller 132 is then able to move the door. By interrupting electrical power to the latch release actuator 108 and the door motor 131, interface system 100 may prevent movement of the door. Unlike some other systems, the interface system 100 does not communicate with the communications bus 140, nor does it send or receive any control signals to or from the body control unit 104. In some embodiments, the interface system 100 interrupts the power to the latch release actuator 108 and the motor and clutch controller 132 whenever the ramp is not fully stowed, as discussed further below.

Figure 2:
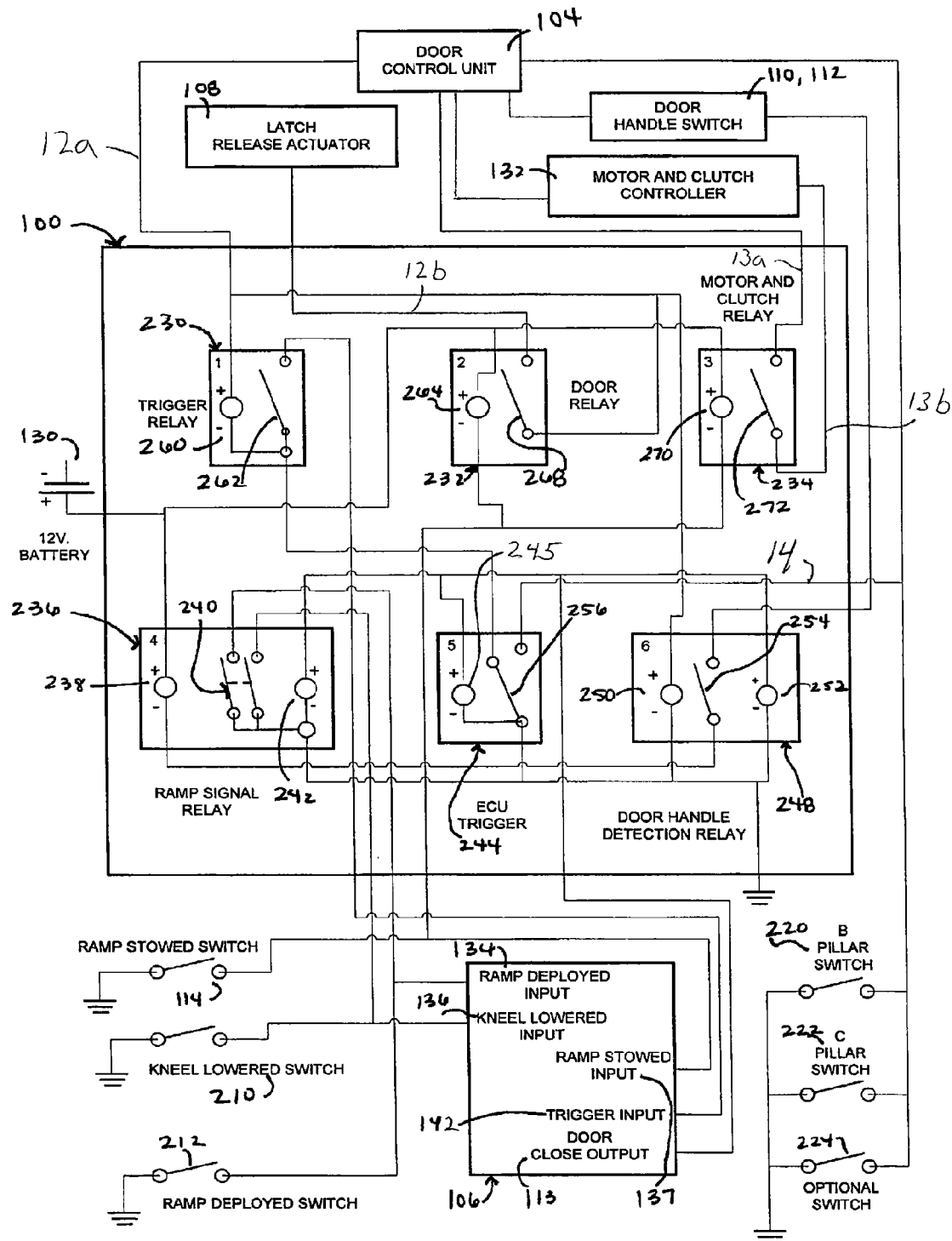
FIG. 2 is a circuit diagram of a switch-based interface system.

As shown in FIG. 2, the interface system 100 is coupled to a battery 130 and includes a ramp trigger relay 230 including a ramp trigger coil 260 and a ramp trigger switch 262, a door relay 232 including door coil 264 and a door relay switch 268, a motor and clutch relay 234 including a motor and clutch coil 270 and a motor and clutch switch 272, a ramp signal relay 236 including a first ramp signal coil 238, a second ramp signal coil 242, and a ramp signal switch 240 (which in the illustrated construction includes a pair of individual switches coupled for operation together), a door trigger relay 244 including a door trigger coil 245 and a door trigger switch 256, and a door handle detection relay 248 including a first door handle detection coil 250, a second door handle detection coil 252, and a door handle detection switch 254. Alternatively, the interface system 100 may include transistors. The door relay 232 is coupled between the door control unit 104 and the latch release actuator 108 by leads 12a and 12b. The motor and clutch relay 234 is coupled between the door control unit 104 and the motor and clutch controller 132 by leads 13a and 13b. The door switch 268 of the door relay 232 remains open until the door coil 264 is activated. Therefore, unless the coil is activated, when the door control unit 104 communicates a power signal, the power signal will be interrupted by the open door switch 268 of the door relay 232. Similarly, the motor and clutch switch 272 of the motor and clutch relay 234 remains open until the motor and clutch coil 270 is activated. The door coil 264 and the motor and clutch coil 270 are activated when the ramp is stowed. When the ramp is no longer fully stowed, a ramp stowed switch 114 will open, thereby disconnecting the coils 264 and 270 from ground and causing the coils 264 and 270 to deactivate. When the coils 264 and 270 are deactivated, the switches 268 and 272, respectively, open. Thus, the power to the latch release actuator 108 and motor and clutch controller 132 are interrupted. The ramp stowed switch 114 is also coupled to a ramp stowed input 137 of the ramp controller 106 so the ramp controller can determine whether or not the ramp is fully stowed.

The interface system 100 controls the power to the latch release actuator 108 and to the motor and clutch controller 132 as described above when the door operation request is communicated with the door control unit 104 by the body control unit 102 (FIG. 1). Although the door control unit 104 contains software and hardware that controls the proper operation of the latch release actuator 108 and motor and clutch controller 132, the door control unit 104 needs to receive authorization from the body control unit 102 before such operation. The door control unit 104 receives authorization from the body control unit 102 when certain conditions are met. For example, the body control unit 102 may monitor several switches mounted at various places inside the vehicle, which reflect conditions such as transmission position, vehicle speed, and door lock condition. If the body control unit 102 determines that the conditions are met, it then sends authorization to the door control unit 104.

The body control unit 102 may receive a door operation request from a sliding door satellite switch 101. This switch is tied to chassis ground and when depressed sends a ground (low) signal to the body control unit 102. Alternately or additionally, the body control unit 102 may receive a door operation request from a remote transmitter 122 via a remote receiver 120 (which may be located inside the vehicle) and a second data bus 141. The remote transmitter 122 may enable keyless entry into the vehicle by communicating a door operation request to the body control unit 102. The remote transmitter 122 may include a button, be mounted on a keychain and may issue a door operation request when the button is pushed.

However, if the door operation request is communicated with the door control unit 104 without going through the body control unit 102 first, the interface system 100 may control the power from the door control unit 102 in a different manner.

Such door operation requests may originate from a pillar switch (such as B pillar switch 220, C pillar switch 222) an optional switch 224, the vehicle's inside door handle 110 or the vehicle's outside vehicle door handle 112. As shown in FIGS. 1 and 2, when a pillar switch 220, 222, optional switch 224 or door handle switch 110, 112 is activated, it sends a ground (low) signal to the door control unit 104, bypassing the body control unit 102.

For example, upon receiving a door operation request from one of the pillar switches 220, 222, or from the optional switch 224, the door control unit 104 may send power to the latch release actuator 108 over lead 12a and to the ramp trigger relay 230, which is also coupled to lead 12a. Sending power over lead 12a activates the ramp trigger coil 260 of the ramp trigger relay 230 and causes the ramp trigger switch 262 to close. Closing of the ramp trigger switch 262 communicates a ground signal to the trigger input 142 of the ramp controller 106, which activates the ramp controller 106.

If the door is closed and the ramp is stowed upon receiving a door operation request from one of the pillar switches 220, 222, or from the optional switch 224, the ramp stowed switch 114 is closed, and therefore the door relay switch 268 and motor and clutch switch 272 are also closed. As a result, if the door control unit 104 sends power over lead 12a or lead 13a, that power is communicated to the latch release actuator 108 or motor and clutch controller 132 to allow the door to open.

If the door is open and the ramp is deployed upon receiving a door operation request from one of the pillar switches 220, 222, or from the optional switch 224, the ground signal provided to the trigger input 142 of the ramp controller 106 causes the ramp to stow. Because the ramp is not initially stowed and the ramp stowed switch 114 is therefore open, the motor and clutch switch 272 is also open. Thus, any power sent by the door control unit 104 over lead 13a is not provided to the door motor 131, thereby preventing closing the door on the deployed ramp.

The door close output 113 of the ramp controller 106 is configured to activate the door trigger coil 245 of the door trigger relay 244. The door trigger relay 244, when activated, sends a ground (low) signal over lead 14 that duplicates the ground signal provided to the door control unit 104 when one of the B pillar switches 220, 222 or the optional switch 224 is depressed. This ground signal is transmitted to the OEM door control unit 104 which interprets this signal as a request to operate the power slide door from the B Pillar switch 220. The ramp controller 106 only activates the door trigger coil 245 to communicate this ground signal once it senses that the ramp is fully stowed, as indicated by detecting a ground signal at the ramp stowed input 137. Because the ramp is fully stowed, the door relay 232 and the motor and clutch relay 234 are closed, thus allowing power to be provided to the door motor 131 to close the door.

The following will discuss operation of the interface system 100 when the outside door handle switch 112 is activated. When the outside door handle is activated by, for example, a user entering the vehicle who does not wish to use the ramp, the outside door handle switch 112 is closed, thus communicating a door operation request in the form of a ground signal to the door control unit 104 (see FIG. 1). Under these conditions, the ramp interface system 100 may prevent the ramp from deploying and the vehicle from kneeling. The door handle detection relay 248 and the ramp signal relay 236 are configured to recognize this situation and to allow the door to open while preventing the ramp from deploying and the vehicle from kneeling. In general, if the door handle detection relay 248 and the ramp signal relay 236 detect that a door operation request has been sent to the door control unit 104 from either door handle switch 110 or 112, the door handle detection relay 248 and the ramp signal relay 236 cooperate to send signals to the ramp controller 106 indicating that the ramp is already deployed and the vehicle is already kneeled. Because the ramp controller 106 detects that the ramp is deployed and the vehicle kneeled, the ramp controller 106 will not deploy the ramp.

If the door is closed when the outside door handle 112 is operated, the door will start to open. The ramp controller 106 includes a sensor that communicates a signal to the ramp controller 106 when the door is active, which prompts the ramp controller 106 to activate as well. However, the first door handle detection coil 250 of the door handle detection relay 248, which is coupled to lead 12a, is also activated. Activation of the first door handle detection coil causes the door handle detection switch to close, which in turn provides a ground signal (by way of the door handle switch) to activate the first ramp signal coil 238 of the ramp signal relay 236. Activation of the first ramp signal coil 238 causes the ramp signal switch 240 to close, which communicates a ground signal to the ramp deployed input 134 and the kneel lowered input 136 of the ramp controller 106. This ground signal mimics a ground signal that would otherwise be provided by a kneel lowered switch 210 or a ramp deployed switch 212, which causes the ramp controller 106 to sense that the ramp is deployed and the vehicle is lowered (kneeled), even though they are not. Thus, when the door reaches the fully open position, the ramp controller 106 will not deploy the ramp.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A control system for a vehicle including a door and a ramp, the system comprising:
   a door actuator for moving the door between open and closed positions;
   a ramp controller for controlling movement of the ramp between stowed and deployed positions;
   a door control operable to send a door operation request;
   a door control unit coupled to the door control and operable to control a supply of electrical power to the door actuator in response to the door operation request;
   an interface system coupled to the ramp controller and the door control, and coupled between the door actuator and the door control unit to selectively prohibit the supply of electrical power from reaching the door actuator when the ramp is not stowed.

2. The control system of claim 1, wherein when the ramp is deployed, the interface system signals the ramp controller to stow the ramp in response to receiving the door operation request.

3. The control system of claim 2, wherein the ramp controller sends a ramp stowed signal to the interface system after the ramp controller has stowed the ramp, and wherein in response to receiving the ramp stowed signal, the interface system replicates the door operation request, thereby instructing the door control unit to send the supply of electrical power to the door actuator, and wherein the interface system allows the supply of electrical power to reach the door actuator to close the door.

4. The control system of claim 1, wherein when the ramp is stowed and the door is closed, and in response to operation of the door control to send the door operation request, the door control unit sends the supply of electrical power to the door actuator, and the interface system allows the supply of electrical power to reach the door actuator to open the door.

5. The control system of claim 4, wherein when the door reaches a fully open position, the ramp controller operates to deploy the ramp.

6. The control system of claim 1, wherein the door control is a first door control and sends a first door operation request, and wherein when the ramp is stowed and the door is closed, the system operates to open the door and deploy the ramp in response to the first door operation request, the control system further comprising:
a second door control operable to send a second door operation request, wherein when the ramp is stowed and the door is closed, and in response to operation of the second door control to send the second door operation request, the door control unit sends the supply of electrical power to the door actuator, and the interface system allows the supply of electrical power to reach the door actuator to open the door and sends a replicated ramp deployed signal to the ramp controller to prevent the ramp controller from deploying the ramp.

7. The control system of claim 1, wherein the door control includes at least one of a remote control system and a switch.

8. The control system of claim 1, wherein the door operation request includes a request to open or close the door.

9. A method of coordinating operation of a door control system and a ramp control system in a vehicle having a door and a ramp, the method comprising:
sending a ramp signal that indicates whether the ramp is stowed;
receiving the ramp signal at an interface system, the interface system including a plurality of switches;
configuring the plurality of switches in one of a predetermined plurality of configurations in response to at least the ramp signal;
sending a door operation request from a door control;
receiving the door operation request at a door control system;
sending a supply of electrical power from the door control system to operate a door actuator for moving the door in response to receiving the door operation request;
selectively preventing or allowing the supply of electrical power to reach the door actuator dependent upon the configuration of the plurality of switches.

10. The method of claim 9, wherein selectively preventing or allowing the supply of electrical power to reach the door actuator includes preventing the supply of electrical power from reaching the door actuator whenever the ramp is not stowed.

11. The method of claim 9, wherein selectively preventing or allowing the supply of electrical power to reach the door actuator includes allowing the supply of electrical power to reach the door actuator whenever the ramp is stowed.

12. The method of claim 9, wherein selectively preventing or allowing the supply of electrical power to reach the door actuator includes selectively opening and closing one of the plurality of switches that is coupled to a power line that carries the supply of electrical power between the door control system and the door actuator.

13. The method of claim 9, wherein sending a door operation request from a door control includes receiving a wireless signal from a remote control, interpreting the wireless signal at a remote receiver, and sending the door operation request from the remote receiver.

14. A door and ramp control system for a vehicle having a door and a ramp, the system comprising:
a door actuator for opening and closing the door;
a ramp actuator for stowing and deploying the ramp;
a ramp sensor that sends a ramp signal corresponding to a position of the ramp;
a door control system coupled to the door actuator and the door sensor, the door control system operable to send a supply of electrical power to the door actuator to open or close the door;
a door control coupled to the door control system and operable to send a door operation request, the door control system sending the supply of electrical power in response to receiving the door operation request;
an interface system coupled to the door control, the ramp sensor, and the ramp actuator, the interface system including a plurality of switches that operate in response to at least the ramp signal, wherein at least one of the plurality of switches is coupled between the door control system and the door actuator to selectively prevent or allow the supply of electrical power sent from the door control system to reach the door actuator.

15. The system of claim 14, wherein the at least one of the plurality of switches is open to prevent the supply of electrical power from reaching the door actuator whenever the ramp is not stowed.

16. The system of claim 14, wherein the at least one of the plurality of switches is closed to allow the supply of electrical power to reach the door actuator whenever the ramp is stowed.

17. The system of claim 14, further comprising a power line that extends between the door control system and the door actuator and that carries the supply of electrical power, the at least one of the plurality of switches coupled to the power line to selectively create an open or a closed circuit on the power line to prohibit or allow, respectively, the supply of electrical power to reach the door actuator.

18. The system of claim 14, wherein the door control includes a remote control and a remote receiver, and wherein the remote receiver sends the door operation request in response to a wireless signal from the remote control.

* * * * *